United States Patent [19]

Davis

[11] Patent Number: 4,494,647
[45] Date of Patent: Jan. 22, 1985

[54] CLEANING ASSEMBLY FOR A DRYER FEED CHUTE

[75] Inventor: Charles E. Davis, Mulberry, Fla.
[73] Assignee: CF Industries, Inc., Long Grove, Ill.
[21] Appl. No.: 411,611
[22] Filed: Aug. 26, 1982
[51] Int. Cl.³ ............................................. B65G 45/00
[52] U.S. Cl. .................................... 198/494; 198/631; 222/404
[58] Field of Search ................ 222/404, 229; 198/494, 198/529, 616, 533, 498, 674, 675, 631, 664, 669, 672, 500

[56] References Cited

U.S. PATENT DOCUMENTS

| | | | |
|---|---|---|---|
| 1,073,425 | 9/1913 | Lambert | 198/664 X |
| 2,228,840 | 1/1941 | Mittendorf | 198/631 X |
| 2,721,665 | 10/1955 | Goeke | 198/631 |
| 2,765,899 | 10/1956 | Ballard | 198/674 X |
| 3,080,045 | 3/1963 | Douglas | 198/500 |
| 3,647,094 | 3/1972 | Jackson | 198/674 X |

FOREIGN PATENT DOCUMENTS 56-136714  10/1981  Japan ................................ 198/672

Primary Examiner—Joseph E. Valenza
Assistant Examiner—David A. Bucci
Attorney, Agent, or Firm—Trexler, Bushnell & Wolters

[57] ABSTRACT

A novel cleaning assembly for a dryer feed chute comprises a shaft, a housing in which said shaft is rotatably mounted, a carriage for carrying the housing and the shaft member, drive mechanism for rotating the shaft, and an oscillating chain for moving the housing and hence the shaft in the longitudinal direction. The oscillating mechanism includes control structure for providing longitudinal movement of the housing and the shaft from a first position to a second position and thereafter back to the first position to complete a cycle.

6 Claims, 13 Drawing Figures

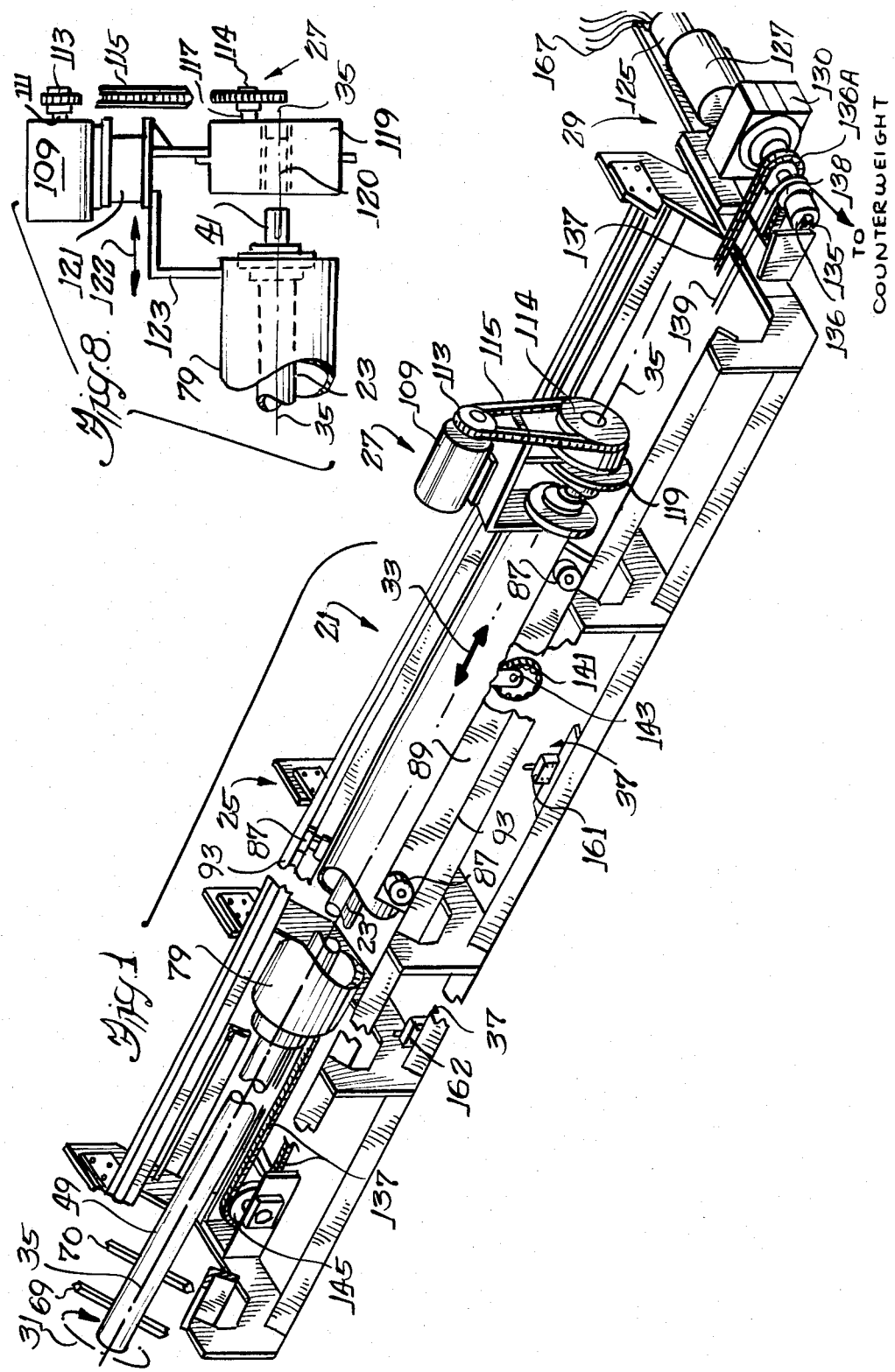

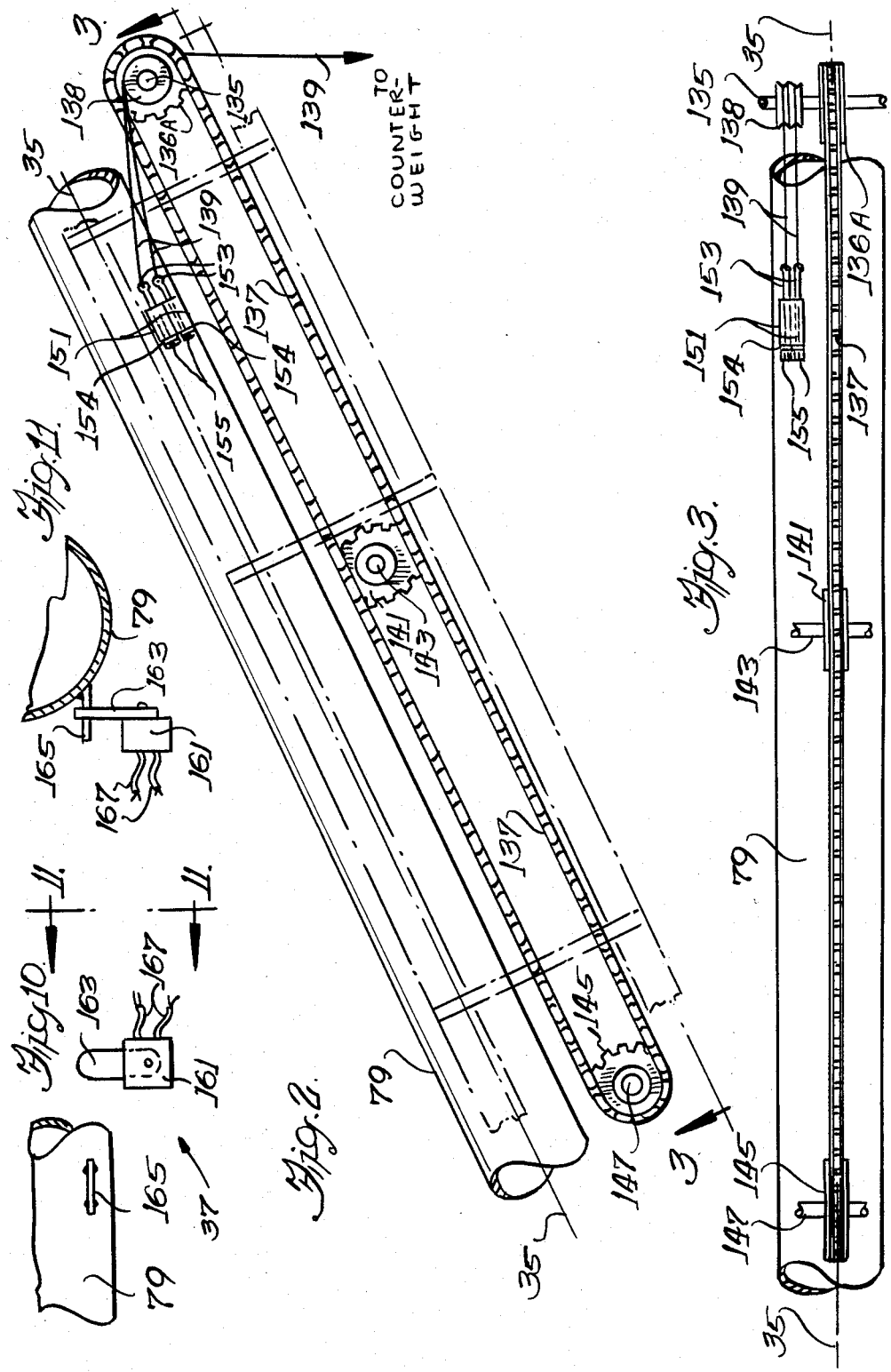

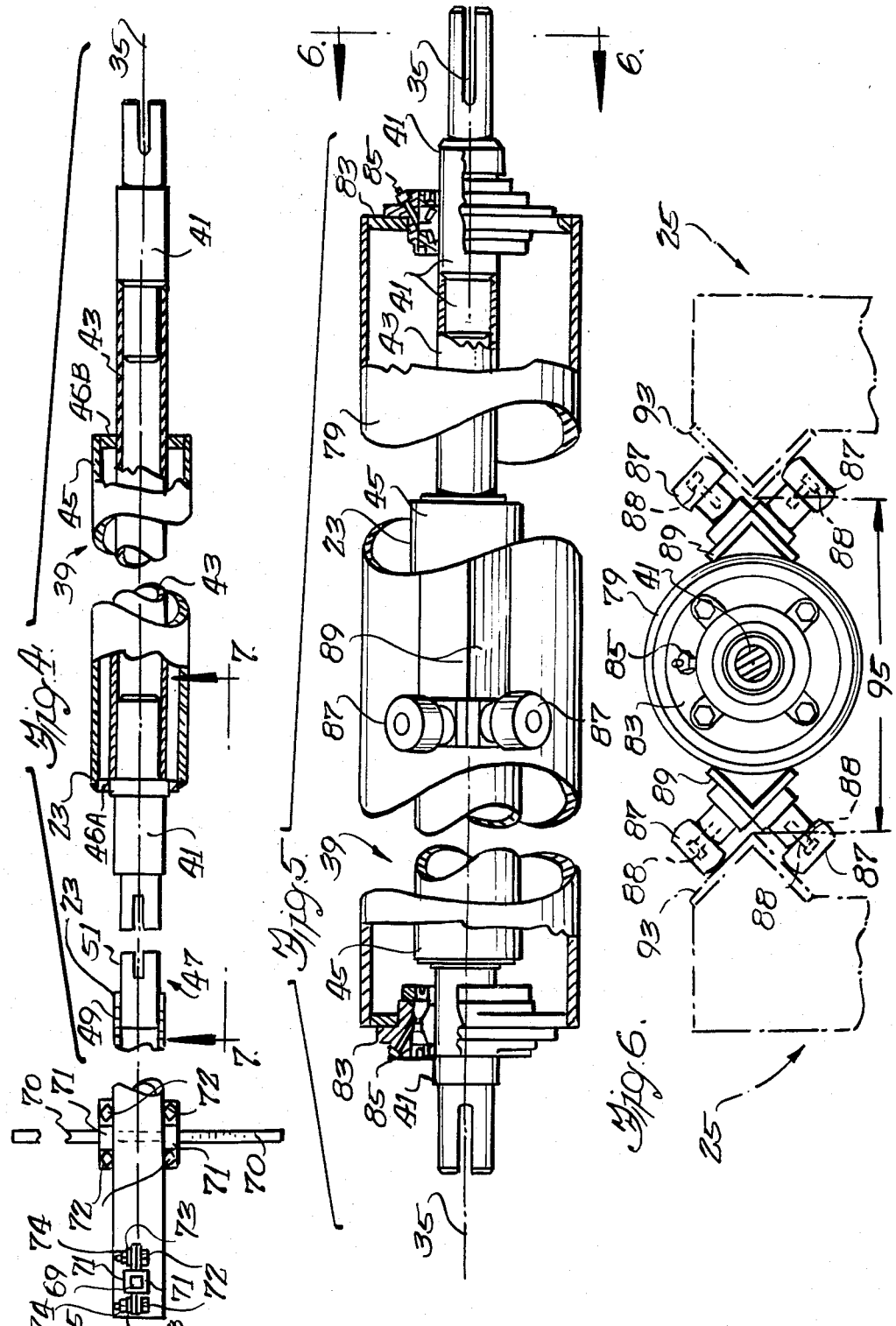

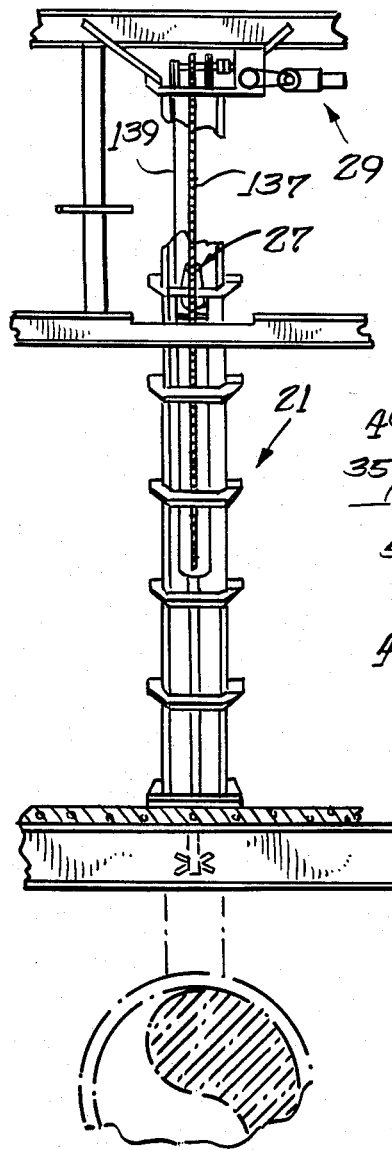
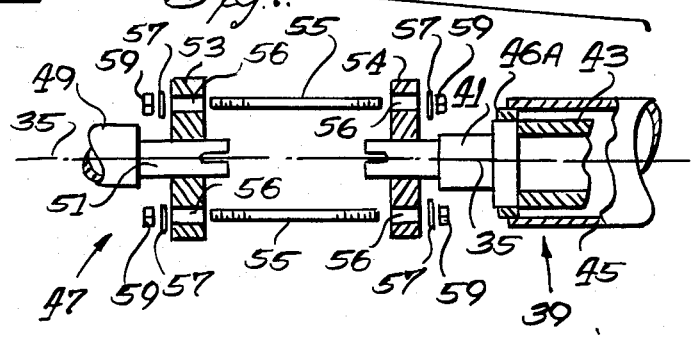
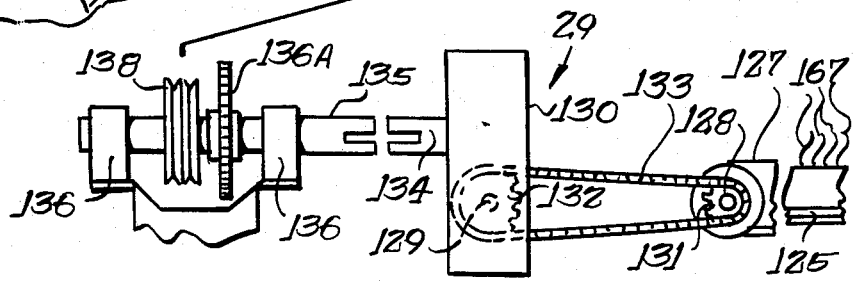

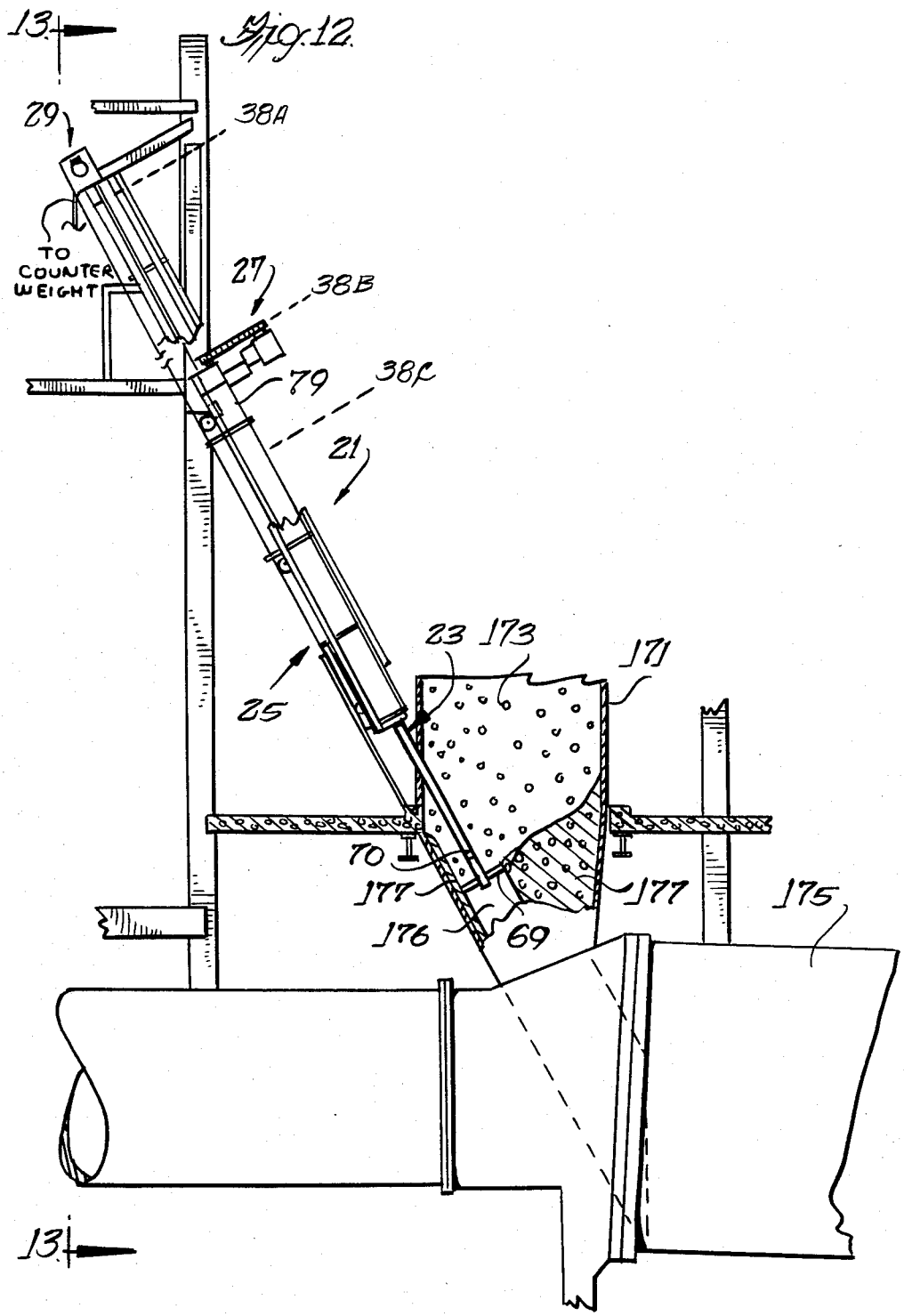

CLEANING ASSEMBLY FOR A DRYER FEED CHUTE

BACKGROUND OF THE INVENTION

My invention is directed to a novel cleaning assembly, and more particularly to a novel cleaning assembly for use within a dryer feed chute.

Many chemical materials or substances are manufactured or produced in a wet, semi-wet or otherwise "sticky" state, and at some time after being manufactured, are fed into a dryer for partial or total removal of water therefrom. Such wet or semi-wet materials are usually fed into the dryer via a feed chute. Often, when feeding such moist material into the dryer, a material buildup has a tendency to accumulate on the inner periphery of the dryer feed chute to the point where free passage of the material into the dryer becomes partially or totally blocked. Such a tendency requires positive action to keep the dryer feed chute clear to maintain a forward flow of material into the dryer.

The current practice is to employ manual labor to prevent such a material buildup. Current reliance upon manual labor to maintain a forward flow of material through the feed chute involves high costs. Moreover, in spite of the precautions taken to manually maintain flow, the dryer feed chute occasionally plugs to the point where shutdown of the dryer and clean out of the feed chute is required. Many times, such shut downs and costs associated therewith become expensive.

From an economic standpoint, it is desirable to have an apparatus which automatically cleans out the dryer feed chute thereby reducing or eliminating associated costs of manual labor. It is also desirable that the cost of operating such an apparatus be significantly lower than the associated manual labor costs.

Moreover, it is desirable that such an apparatus be rugged and durable and that such an apparatus be capable of operating over a long period of time while requiring little or no maintenance. It is additionally desirable that such an apparatus be able to be quickly disassembled, to be manufactured from readily available parts, and to be simple enough in concept to be modifiable and thus suitable in a variety of similar applications.

OBJECTS AND SUMMARY OF THE INVENTION

Accordingly, a general object of my invention is to provide a novel cleaning assembly for use within a dryer feed chute.

A more specific object is to provide such a cleaning assembly which is capable of providing automatic and reliable operation over a long period of time.

A further object is to provide such a cleaning assembly which automatically prevents material buildup of moist or "sticky" material within the inner periphery of a dryer feed chute.

Yet another object of my invention is to provide such a cleaning assembly which is economical in its design and manufacture, and yet which is adaptable to a variety of similar uses.

Briefly, and in accordance with foregoing objects, a novel cleaning assembly for a dryer feed chute, according to my invention, comprises a shaft member, carriage means for carrying such a shaft member, drive means for rotating the shaft member in an angular direction, and oscillating means for reciprocally moving the shaft member in a longitudinal direction. The oscillating means includes cycling means for longitudinally moving the shaft member from a first position to a second position and thereafter back to the first position thereby completing a cycle.

BRIEF DESCRIPTION OF THE DRAWINGS

The foregoing, as well as other objects, features, and advantages of my invention, will become more readily understood upon reading the following detailed description of the illustrated embodiments, together with reference to the drawings wherein:

FIG. 1 is a perspective view, partially in section, of a cleaning assembly in accordance with my invention;

FIG. 2 is a side view of a portion of the cleaning assembly, wherein my preferred embodiment of the oscillating means for reciprocally moving the shaft member in the longitudinal direction is presented in rellation to a portion of the shaft member, details of the carriage means (for carrying the shaft member) having been deleted to highlight the details of the oscillating means;

FIG. 3 is a bottom view taken generally along the line 3—3 of FIG. 2;

FIG. 4 is a side view, partially in section, of a preferred embodiment of the shaft member of my invention;

FIG. 5 is a side view, partially in section, of my preferred embodiment of a housing surrounding a portion of the shaft member;

FIG. 6 is an end view taken generally along the line 6—6 in FIG. 5, a portion of the carriage means for carrying the shaft member having been added to FIG. 6, in phantom line detail, to present engagement of the shaft member housing with the carriage means;

FIG. 7 is a side view, partially in section, the view taken generally along the line 7—7 in FIG. 4, the view presenting connection details of the shaft member not otherwise shown in FIG. 4;

FIG. 8 is a side view, partially in section, of a preferred embodiment of the drive means for rotating the shaft member in the angular direction, in accordance with my invention;

FIG. 9 is a side view of a preferred embodiment of the oscillating means for reciprocally moving the shaft member in the longitudinal direction, in accordance with my invention;

FIG. 10 is a side view presenting a preferred embodiment of cycling means for longitudinally moving the shaft member from a first position to a second position and thereafter back to the first position thereby completing a cycle, in accordance with my invention;

FIG. 11 is an end view taken generally along the line 11—11 of FIG. 10;

FIG. 12 is a side view, partially in section, of my cleaning assembly as preferably used in combination with a dryer feed chute; and FIG. 13 is an end view taken generally along the line 13—13 in FIG. 12.

DETAILED DESCRIPTION OF THE ILLUSTRATED EMBODIMENTS

Referring to the drawings and initially to FIG. 1, a cleaning assembly, referred to generally by the reference numeral 21, will now be discussed. The cleaning assembly comprises a shaft 23, carriage means 25 for carrying the shaft 23, drive means 27 for rotating the shaft 23 in an angular direction, and oscillating means 29 for reciprocally moving the shaft 23 longitudinally. Referring to FIG. 1, it will be seen that the angular direction of rotation of the shaft 23 is represented by an arrow 31; and, that my preferred orientation of the longitudinal direction of reciprocal movement of the shaft 23 (represented by a double-headed arrow 33) is essentially along the axis of rotation 35 of the shaft 23.

The oscillating means 29 (FIGS. 1, 9, 12 and 13) includes cycling means (FIGS. 1, 10 and 11) 37 for providing longitudinal movement of the shaft 23 from a first position 38A, through an intermediate position 38B, to a second position 38C, and thereafter back to the first position 38A, thereby completing a cycle. (See FIG. 12.)

My cleaning assembly 21 is preferably used in combination with a feed chute supplying moist monocalcium phosphate into a dryer. I have observed that the combined rotational and longitudinal action of my cleaning assembly 21 prevents the moist monocalcium phosphate from totally or otherwise unacceptably plugging the inner periphery of the dryer feed chute. I have found that for optimal operation, the rotational speed of the shaft 23 ought to be about 10 rpm, the full cycle time ought to be between about 12 and 13 minutes, the distance of longitudinal movement from the first position to the second position ought to be about 18 feet, and the inclination of the axis 35 above a horizontal reference plane ought to be between about 35 and 75 degrees.

Referring to FIG. 4, my preferred embodiment of a portion of the shaft 23 is seen to comprise two cylindrical members oriented co-linearly along the axis of rotation 35. The first cylindrical member, referred to generally by the reference numeral 39, is preferably fabricated of solid metal at both ends. The first cylindrical member 39 includes cylindrical pieces of bar stock 41 at the respective ends. To minimize rotational energy requirements, the first cylindrical member 39 further includes a first or inner pipe 43 longitudinally oriented along the axis of rotation 35. Reduced ends of the pieces of bar stock 41 are inserted into respective ends of the inner pipe 43 and are preferably welded into place. The inner pipe is preferably nominally three inches in diameter, Schedule 80, and made of carbon steel.

Again, referring to FIG. 4, it will be seen that the first cylindrical member 39 includes a second or outer pipe 45 (also longitudinally oriented along the axis of rotation 35) for added strength and stiffness. The inner pipe 43 is disposed within the outer pipe 45 such that the respective axes of both pipes 43 and 45 coincide with the axis of rotation 35. At one end of the outer pipe 45 an annular spacer 46A is fitted between an integral collar on the bar stock 41 and the outer pipe 45. At the other end of the outer pipe 45 another annular spacer 46B is fitted between the inner pipe 43 and the outer pipe 45. Both spacers 46A and 46B are preferably welded into place. The outer pipe 45 is preferably nominally 6 inches in diameter, Schedule 40, and made of carbon steel.

Still referring to FIG. 4, my preferred embodiment of the shaft 23 will be seen to further include a second cylindrical member, referred to generally by the reference numeral 47. (My preferred manner of coupling the first cylindrical member 39 to the second cylindrical member 47 is not presented in FIG. 4, but rather is presented separately in FIG. 7.) The second cylindrical member 47 includes a pipe 49 and a piece of bar stock 51, both of which are longitudinally oriented along the axis of orientation 35. The bar stock 51 is disposed in one end or a first end of the pipe 49 such that the respective axes of both bar stock 51 and pipe 49 lie on the axis of rotation 35. I then prefer to weld the bar stock 51 in place within the first end of pipe 49. The pipe 49 is preferably nominally 4 inches in diameter, Schedule 40, and made of carbon steel.

Referring to the second or other end of the pipe 49, it will be seen (by referring to FIG. 4) that rectangular metal rods 69, 70 pass through the pipe 49 and are staggered, one rod 69 from the other rod 70, at about 90°, both rods 69 and 70 being oriented substantially transverse to the axis of rotation 35. The first rod 69 is fixed closer to the second end of the pipe 49 than is the second rod 70. Both rods 69,70 extend sufficiently far enough away from the pipe 49 to be effective striking implements for use within a dryer feed chute. The rods 69, 70 will, of course, wear out with use and thus it is desirable that such rods 69, 70 be easily replaced. Accordingly, I prefer to secure the rods 69, 70 to the pipe 49 by using retaining plates 71 which have been adapted to fit around certain portions of the rods 69 and 70 which protrude outwardly from the pipe 49. The retaining plates 71 are held together in a known manner using threaded bolts 72, washers 73 and nuts 74.

Referring to FIG. 7, my preferred manner of coupling or connecting the first cylindrical member 39 to the second cylindrical member 47 will be seen to be through use of flanges 53, 54 circumferentially carried by respectively facing bar stock ends 51 and 41. I prefer to weld the flanges 53 and 54 respectively to the bar stock 51 and 41. I then prefer to draw together and to couple one flange 53 to the other flange 54 by inserting threaded rods 55 through holes 56 in the flanges 53, 54 such that respective axes of both first and second cylindrical members 39 and 47 lie on the axis of rotation 35. Next, I apply a washer 57 to each end of each threaded rod 55 and turn a nut 59 thereon, thereby drawing the flanges 53 and 54 together.

I now wish to direct the reader's attention to FIG. 5 where it will be seen that the first cylindrical member 39 is longitudinally disposed within a cylindrical housing 79. The cylindrical housing 79 is adapted to be longitudinally movable along the axis of rotation 35; the first cylindrical member 39, on the other hand, is adapted not only to be longitudinally carried along the longitudinal axis 35 but also to be angularly rotatable about the longitudinal axis 35. Appropriately sized and designed bearings 83 are inserted into respective ends of the cylindrical housing 79 and are preferably welded into place. The bearings 83 carry the respective ends of bar stock 41 of the first cylindrical member 39 such that respective axes of both the first cylindrical member 39 and the cylindrical housing 79 lie on the axis of rotation 35. The ends of bar stock 41 extend outwardly from respective ends of the cylindrical housing 79 and through respective bearings 83 such that effective rotation of the first cylindrical member 39 about the axis 35 can be achieved relative to the cylindrical housing 79. Preferred bearings 83 are equipped with grease fittings 85.

Referring to FIG. 6, it will be seen that the cylindrical housing 79 externally carries a plurality of rollers 87 for longitudinally sliding the shaft 23 along the carriage means 25. The rollers 87 are individually fastened (using bolts 88) to support plates 89 which are welded (or otherwise secured in a known manner) to oppositely directed lateral areas along the outer periphery of the cylindrical housing 79. The rollers 87 are preferably aligned along the outer periphery of the cylindrical housing 79 such that the rollers 87 engage a pair of tracks 93 (which are included as part of the carriage means 25). Each track 93 is essentially an L-shaped member (preferably an angle iron). The tracks 93 run substantially along the entire length of the carriage means 25 (FIG. 1). The cylindrical housing 79 is interposed between the apex portions of the pair of L-shaped tracks 93. The cylindrical housing 79 is carried along the L-shaped tracks by the engagement of the rollers 87 along the exterior surfaces of the respective tracks 93. A space or gap 95 between exterior apex portions of the tracks 93 must be generally maintained substantially along the entire length of the carriage means 25 so that the cylindrical housing 79 does not become bound up between the tracks 93 when longitudinally moving along the axis 35. Yet, the shaft 23 must not be permitted to fall from the carriage means 25. My cleaning assembly 21 includes adjustment means (not shown) along the entire length of the carriage means 25 for maintaining such a space or gap 95 between the tracks 93.

Thus, one feature of my cleaning assembly 21 is that the longitudinal motion of the cylindrical housing 79 carries therewith the rotational motion of the shaft 23. For example, longitudinal motion of the shaft 23 is substantially confined along the axis 35 because of the cooperation between the rollers 87 upon the tracks 93 and because of the maintenance of the gap or space 95 (FIG. 6) substantially along the entire length of the carriage means 25 (FIG. 1). Such cooperation along the entire length of the tracks 93 substantially prevents up-and-down or side-to-side movement of the shaft 23 along the tracks 93 with respect to the axis 35, and confines movement of the shaft 23 longitudinally along the axis 35. But more importantly, rotational motion of the shaft 23 about the axis 35, in addition to the longitudinal motion therealong, is achieved by nature of the cooperation between the shaft 23, the cylindrical housing 79 and the bearings 83 (FIG. 5).

The cleaning assembly 21 has generally been designed to confine failures (due principally to longitudinal motion of the shaft 23 along the axis 35) to the rollers 87, the support plates 89, the bolts 88, or the tracks 93. Thus, if and when failure occurs, repair,downtime, and associated costs are thereby effectively held to a minimum.

The cleaning assembly 21 has further generally been designed to confine friction (due principally to rotation of the shaft 23 about the axis 35) to the bar stock pieces 41 which are located at respective ends of the pipe 43 (FIG. 5). A commercially available lubricant, supplied to the bearings 83 via the grease fittings 85, permits rotation of the shaft 23 within the cylindrical housing 79; and, in effect, isolates or divorces the cylindrical housing 79 from the angular rotation of the shaft 23. Thus, torque-induced failures are substantially isolated from the carriage means 25, and are primarily restricted to the shaft 23.

Referring to FIGS. 1 and 8, the drive means 27 will be seen to include a motor 109 having an output shaft 111 which is coupled by sprockets 113, 114 and a chain 115 to an input shaft 117 of a gearbox 119. The bar stock 41 end of the shaft 23, when inserted into an appropriate cylindrical cavity 120 of the gearbox 119 and appropriately keyed thereto is thus driven by the gearbox 119.

The motor 109 is mounted on a support 121 which is slidable in a direction parallel to the axis of rotation 35 (as indicated by a double-headed arrow 122) along a frame 123 which is upwardly mounted on the outer surface of the cylindrical housing 79. The end of the bar stock 41 is inserted into the cavity 120 of the gearbox 119 as the support 121 slides to the left relative to the frame 123 (FIG. 8). The support 121 is then suitably fixed to the frame 123, as by bolting it thereto. The output shaft 111 of the motor 109 thus drives the input shaft 117 of the gearbox 119 in a known manner, using appropriate sprockets 113, 114 and appropriate chain 115. Rotation of the input shaft 117 of the gearbox 119, in turn, causes the shaft 23 to rotate about the axis of rotation 35.

It can be appreciated that the shaft 23 can thus be caused to rotate at a rotational speed different from that of the output shaft 111 of the motor 109. The preferred rotational speed of the shaft 23 is slower than the rotational speed of the output shaft 111 of the motor 109. It can further be appreciated that the overall design of my cleaning assembly 21 permits slight modification in design so as to permit direct coupling of the output shaft 111 of the motor 109 to the bar stock 41 end of the shaft 23, if such is desirable.

Referring to FIGS. 1 and 9, the longitudinally or axially oscillating means 29 will be seen to include a motor 125 directly coupled to a first right angle gearbox 127, an output shaft 128 of the first right angle gearbox 127 being coupled to an input shaft 129 of a second right angle gearbox 130, by appropriate sprockets 131 and 132 and a chain 133. An output shaft 134 of the second right angle gearbox 130 is suitably coupled (details not shown) to an independent shaft 135 which is mounted by a pair of bearings 136. The independent shaft 135 carries a toothed sprocket 136A for a chain 137 (see also FIGS. 2 and 3) and a dual-grooved sheave 138 for two wire cables or ropes 139, each wire rope 139 fitting into a respective groove of the sheave 138 (FIG. 3). Although my manner of coupling the output shaft 134 of the second right angle gearbox 130 to the independent shaft 135 is not shown (in FIG. 9), I prefer to couple these together by welding or otherwise securing a flange to a butt end of each respective shaft 134, 135, then inserting threaded rods through holes in the flanges, and then using washers and nuts to draw the flanges together, much the way the bar stock 51, 41 ends are coupled and presented in FIG. 7.

Referring to FIGS. 2 and 3, the chain 137 will be seen to engage an idler sprocket 141 (mounted on a shaft 143) and a driven sprocket 145 (mounted on a shaft 147). Viewing the underside of the cylindrical housing 79, it will be seen that the chain 137 (FIG. 3) is essentially oriented parallel to the axis 35. As the shaft members 135, 143 and 147 are fixded transversely in relation to the axis 35 (FIG. 3), it will be appreciated that the chain 137 serves to stabilize the longitudinal motion of the cylindrical housing 79 and the shaft 23 along the carriage means 25 (see FIG. 1). Suitable means (not shown) couples the housing 79 to the adjacent reach of the chain 137 to cause the housing 79 to reciprocate with chain.

The cylindrical housing 79 carries two retaining blocks 151 for retaining or securing the wire ropes 139 to the cylindrical housing 79 (and thereby securing the shaft 23). Threaded eye bolts 153 are individually fitted through holes in each retaining block 151 and are secured to the retaining blocks 151 in a known manner using washers 154 and nuts 155 (FIGS. 2 and 3). The preferred manner of carrying the retaining blocks 151 is by welding them onto a portion of the outer periphery of the cylindrical housing 79.

One end of each wire rope 139 is secured through the eye of a respective individual eye bolt 153. The other ends of the wire ropes 139 are secured to a counterweight (not shown). The mass of the counterweight is chosen so as to balance the weight of the shaft 23, and associated structure, at the predetermined angle of inclination of the carriage means 25 with the horizontal plane.

To provide the oscillating means 29 with the cycling means 37 (mentioned above), I prefer to use at least two limit switches 161, 162 (FIG. 1). With the two limit switches 161, 162 mounted upon the carriage means 25, an arm 163 (FIGS. 10 and 11) of the first limit switch 161 can be moved by an extension or finger 165 extending from the cylindrical housing 79 as the cylindrical housing 79 moves longitudinally along the axis 35. Such a contact of the extension 165 with the arm 163 causes the first limit switch 161 (having appropriate connections 167 to the motor 125; see FIGS. 1, 10 and 11) to operate in a known manner and to reverse the rotation of the motor 125 thereby reversing the direction of longitudinal motion of the cylindrical housing 79 along the axis 35 (FIG. 2). It can be appreciated that the cylindrical housing 79 (carrying the shaft 23) can then be caused to again reverse motion longitudinally along the axis 35 when the extension 165 comes in contact with my second limit switch 162 (FIG. 1) which is similarly adapted to reverse the rotation of the motor 125. To achieve such a cycling result, others, of course, may wish to use a single limit switch or more than two limit switches.

Thus, as the shaft 23 rotates in the angular direction about the axis 35, the shaft 23, the cylindrical housing 79 and the end bearings 83 cooperate with the rollers 87 and the tracks 93 thereby permitting rotation about the axis 35 and longitudinal motion along the axis 35, which, in turn, permits the pipe 49, at the forward or lead end of the shaft 23, to rotate and to move longitudinally whereby the outwardly and forwardly extending rods 69, 70 strike material accumulating within the inner periphery of the feed chute thereby causing such material to break free from such inner periphery and to drop down into the dryer.

Referring to FIG. 12, I prefer to orient the carriage means 25 at an angle sufficient (and to insert the rectangular rods 69, 70 of the shaft 23 into a feed duct 171 in a manner sufficient) to promote free and efficient flow of monocalcium phosphate particles 173 into a dryer 175. It can be here seen that the rectangular rods 69, 70 clear a path 176 through a build-up 177 of such particles 173 (which would normally bridge over and either substantially or entirely restrict flow through the feed duct 171).

What has been illustrated and described herein is a novel cleaning assembly particularly useful within a dryer feed chute. While the cleaning assembly has been illustrated and described with reference to several preferred embodiments, the invention is not limited thereto. On the contrary, alternatives, changes or modifications may become apparent to those skilled in the art upon reading the foregoing description. Accordingly, such alternatives, changes or modifications are to be considered as forming a part of the invention insofar as they fall within the spirit and scope of the appended claims.

I claim:

1. A cleaning assembly, such as for a dryer feed chute, comprising: (a) a shaft member; (b) a housing, means rotatably mounting said shaft member in said housing (c) carriage means, (d) means for carrying said housing thereon; (e) drive means for rotating said shaft member relative to said housing; (f) oscillating means for moving said housing and said shaft member in a longitudinal direction, said oscillating means including cycling means for providing movement of said shaft member from a first position to a second position and thereafter back to said first position thereby completing a cycle, and (g) dislodging means adjacent one end of said shaft means for dislodging feed material in said feed chute.

2. The cleaning assembly of claim 1 wherein said dislogding means includes two rectangularly shaped bars of metal disposed substantially at right angles to one another.

3. The cleaning assembly as set forth in claim 1 wherein said housing is cylindrical, and wherein said shaft member and said housing are coaxial.

4. The cleaning assembly as set forth in claim 2 wherein the first one of said two metal bars is carried proximate to the end of said shaft member and passes substantially transversely therethrough, and wherein the second one of said two metal bars is carried by said shaft member proximate to said first metal bar and spaced therefrom axially of said shaft member, said second metal bar passing substantially transversely through said shaft member.

5. A cleaning assembly as set forth in claim 3 wherein said carriage means includes two tracks parallel to one another, and wherein said cylindrical housing has roller means thereon for longitudinally sliding said housing and said shaft member along said tracks.

6. A cleaning assembly, such as for a dryer feed chute, comprising: (a) a shaft member; (b) carriage means for carrying said shaft member thereon; (c) drive means for rotating said shaft member; and (d) oscillating means for moving said shaft member in a longitudinal direction, said oscillating means including cycling means for providing movement of said shaft member from a first position to a second position and thereafter back to said first position thereby completing a cycle, said carriage means including at least two tracks, an orientation for the first track being parallel to orientation of the second track, a housing carrying roller means for longitudinally sliding said housing and said shaft member along said tracks and in fixed relation therebetween, said tracks being adapted to permit said roller means to move substantially along respective surfaces thereof.

* * * * *